United States Patent [19]
Burns et al.

[11] 4,172,630
[45] Oct. 30, 1979

[54] MULTIMODE ELECTROOPTIC WAVEGUIDE SWITCH

[75] Inventors: William K. Burns, Alexandria; Thomas G. Giallorenzi, Springfield, both of Va.

[73] Assignee: The United States of America as represented by the Secretary of the Navy, Washington, D.C.

[21] Appl. No.: 896,062

[22] Filed: Apr. 13, 1978

[51] Int. Cl.² .................................................. G02B 5/14
[52] U.S. Cl. ............................ 350/96.14; 350/96.15; 350/355
[58] Field of Search ............... 350/96.12, 96.13, 96.14, 350/96.15, 355

[56] References Cited
U.S. PATENT DOCUMENTS

| | | | |
|---|---|---|---|
| 4,003,629 | 1/1977 | Baues et al. | 350/96.14 |
| 4,008,947 | 2/1977 | Baues et al. | 350/96.14 |
| 4,130,342 | 12/1978 | McMahon | 350/96.14 |

OTHER PUBLICATIONS

Nelson et al., "Electro-optic Channel Waveguide Modulator ...", *Applied Physics Letters*, vol. 28, No. 6, Mar. 1976, pp. 321-323.
Soref et al., "Multimode Achromatic Electro-optic Waveguide Switch ...", *Appl. Phys. Ltrs.*, vol. 28, No. 12, Jun. 1976, pp. 716-718.

*Primary Examiner*—John K. Corbin
*Assistant Examiner*—John D. Lee
*Attorney, Agent, or Firm*—R. S. Sciascia; Philip Schneider; William C. Daubenspeck

[57] ABSTRACT

An electrooptic switch in which one of four channel waveguides is selectively induced in a thin slab of electrooptic material by the application of an electric field between intersecting strips of electrodes disposed adjacent the top surface of the slab and other intersecting strips of electrodes disposed adjacent the bottom surface directly below the top surface strips. The electrode strips comprise (1) primary electrodes to which constant potentials are applied to induce optical paths partially through the slab and (2) switching electrodes, vertically displaced and electrically isolated from the primary electrodes, to which alternating potentials are applied to complete the desired optical path through the slab.

9 Claims, 5 Drawing Figures

MULTIMODE ELECTROOPTIC WAVEGUIDE SWITCH

BACKGROUND OF THE INVENTION

This invention relates in general to optical switches and, more particularly, to electrooptic waveguide switches for use with multimode optical fibers.

Present integrated-optics switches and modulators are, in general, single-mode devices which are suitable for use only with single-mode optical fiber transmission lines. The fiber-to-film coupling loss is a serious obstacle to the practical utilization of single-mode fiber-switch systems. A primary source of this coupling loss is misalignment between the fiber and the film waveguide. The alignment problem arises because single-mode fibers are typically 2-4 microns in core diameter while the present techniques for alignment are in general accurate to within 1-2 microns. Substantial loss can result from a very small misalignment and, thus, alignment tolerances are very demanding. However, alignment tolerances in a multimode system are much less demanding. Since multimode fibers typically have a core diameter of 50-80 microns and the channel waveguides of the multimode devices have a cross-sectional area of corresponding size, the misalignment losses can be made acceptably small with present alignment techniques. In particular, end-fire coupling techniques may be used to couple multimode fibers to multimode channel waveguides.

Although there are many designs of single-mode switches and modulators suitable for single-mode communication systems, there is a need for active devices suitable for multimode communication systems. A. R. Nelson et al., Applied Physics Letters, Vol. 28 No. 6, p. 321, and R. A. Soref et al. Applied Physics Letters, Vol. 28, No. 12, p. 716, describe a multimode modulator and a multimode three-port switch, respectively, which electrooptically induce channels in a thin slab of $LiNbO_3$. The present invention is an improvement on this previous work and provides a four-port active electrooptic switch which is suitable for use with large-diameter-core multimode fibers.

SUMMARY OF THE INVENTION

In the present invention, one of four optical channel waveguides may be selectively induced in a thin slab of electrooptic material. A total of six primary and four switching electrodes are arranged to form two intersecting electrode strips adjacent the top surface of the slab and two corresponding intersecting electrode strips adjacent the bottom surface. The primary electrodes are disposed so that an electric field between those adjacent the top surface and those adjacent the bottom surface will induce two discontinuous optical paths in the slab. These paths, which provide the four ports of the device, would intersect if they were not discontinuous in the region where the switching electrodes are disposed. The switching electrodes cooperate with the primary electrodes in the region where the intersecting paths are discontinuous to selectively induce a waveguide to complete one of the four possible paths. The mechanism of direction change in the intersection region is total internal reflection at the boundary of a high index region.

Other features and advantages will be set forth in, or readily apparent from, the following detailed description of the preferred embodiment when considered in conjunction with the accompanying drawings wherein:

DETAILED DESCRIPTION OF THE INVENTION

Figure 1:
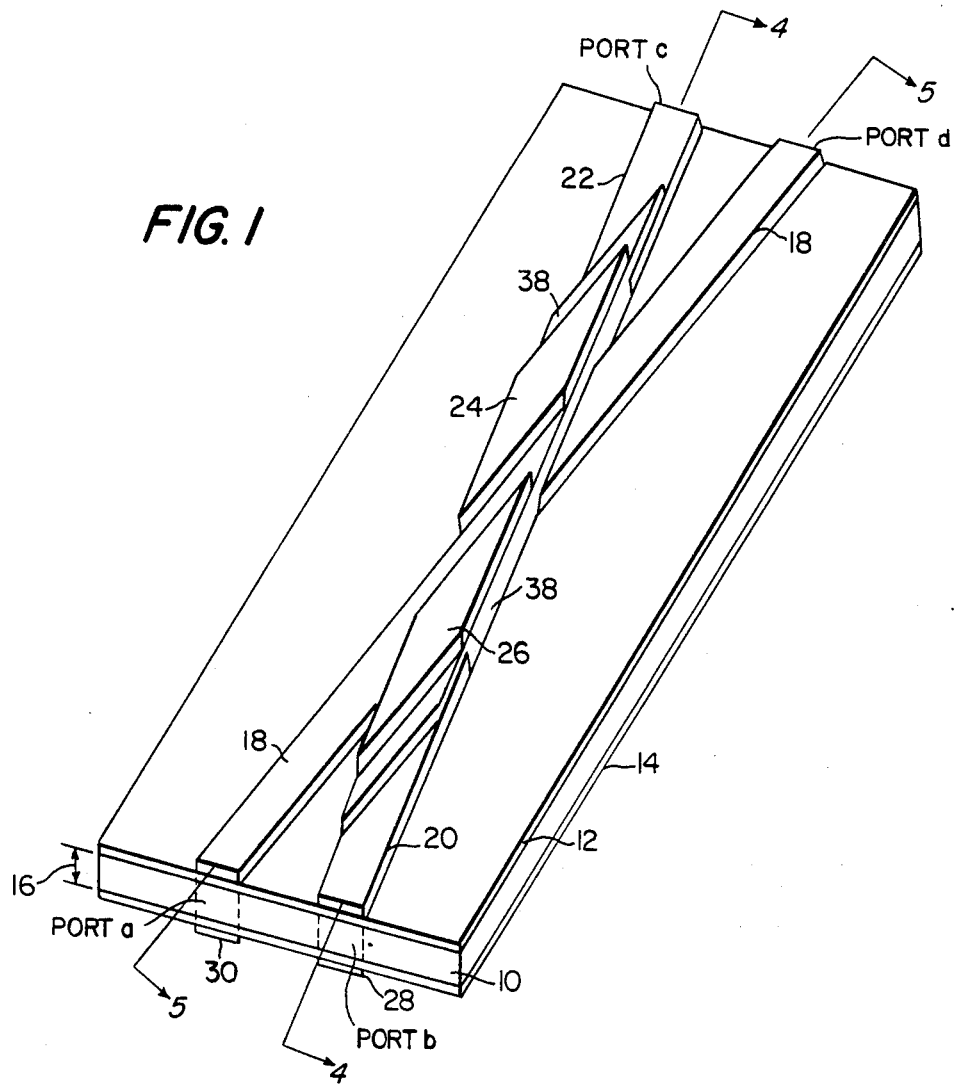
FIG. 1 is a pictorial view of the multimode waveguide switch of the present invention.

FIGS. 1-5 illustrate a multimode electrooptic waveguide switch according to the present invention. The several figures are presented in order to clearly show the structure of the device and like reference characters therein designate the same parts in the several views. As will become apparent from the following description these figures are drawn out of proportion in order to more clearly illustrate the structure and features of the present invention.

Referring now to FIG. 1, the multimode waveguide switch includes a thin crystalline slab 10 of electrooptic material having its top and bottom surfaces covered by thin optical isolation layers 12 and 14, respectively, of a dielectric material having an index of refraction lower than that of the electrooptic material. The slab 10 at the current state of the art will generally be a ferroelectric material such as $LiNbO_3$ or $LiTaO_3$, and the isolation layers 12 and 14 will typically be $SiO_2$. Preferably, the slab of electrooptic material will be of a thickness 16 approximately equal to the core diameter of the multimode fiber to which it is to be coupled, typically 50-80 microns. Isolation layers 12 and 14 will typically be one micron in thickness.

The basic technique of the present invention is to induce channel waveguides in the thin slab 10 of electrooptic material by the application of an electric field through the material. For the proper orientation of the electrooptic material, the electric field will raise the index of refraction through the electrooptic effect and thereby induce a channel waveguide in the region where the field is applied. An electric potential is applied between strip electrodes disposed above the top surface of the slab and strip electrodes disposed directly below them over the bottom surface of the slab to induce the channel waveguides in the slab. The width of the electrodes is chosen so that the induced channels are of approximately the same cross-sectional dimensions as the core of the multimode fibers. In order to provide active four-port switching, two types of electrodes are used, primary electrodes which are maintained at constant potential and switching electrodes which are maintained at various potentials depending on the optical path desired. The channels induced by the primary electrodes are discontinuous in that they do not by themselves provide a complete path through the switch; that is, additional electrodes are required to complete an induced channel through the switch. The switching electrodes are provided to selectively induce, in cooperation with the primary electrodes, channels in the regions where the primary electrodes do not provide a channel, and thereby determine the direction of the optical path through the switch.

Figure 2:
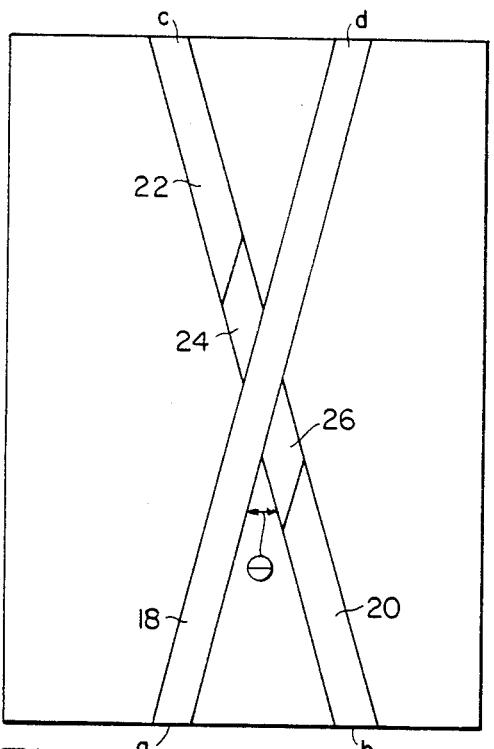
FIG. 2 illustrates the placement of the top surface electrodes of the switch of FIG. 1.
Figure 3:
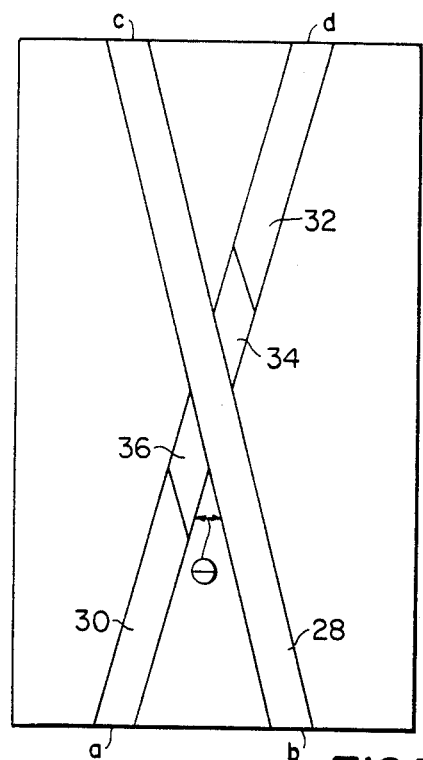
FIG. 3 illustrates the placement of the bottom surface electrodes of the switch of FIG. 1 as viewed from the top of the device.

As shown in FIG. 1 and more clearly shown in FIG. 2 which is a plan view of the switch of FIG. 1, three primary electrodes 18, 20, and 22 and two-switching electrodes 24 and 26 are disposed over the top optical-isolation layer 12. As best shown in FIG. 3 (which illustrates the orientation of electrodes disposed over the bottom optical isolation layer 14 as seen from above the slab) three primary electrodes 28, 30, and 32 and two switching electrodes 34 and 36 are disposed over the bottom optical isolation layer 14. The primary and switching electrodes 18–36 are arranged to provide two intersecting strips of electrodes on the top surface of the switch, and two corresponding intersecting strips of electrodes directly below on the bottom surface of the switch. The switching electrodes are offset vertically from the primary electrodes to avoid inefficient horizontal-fringing-field gaps.

Figure 4:
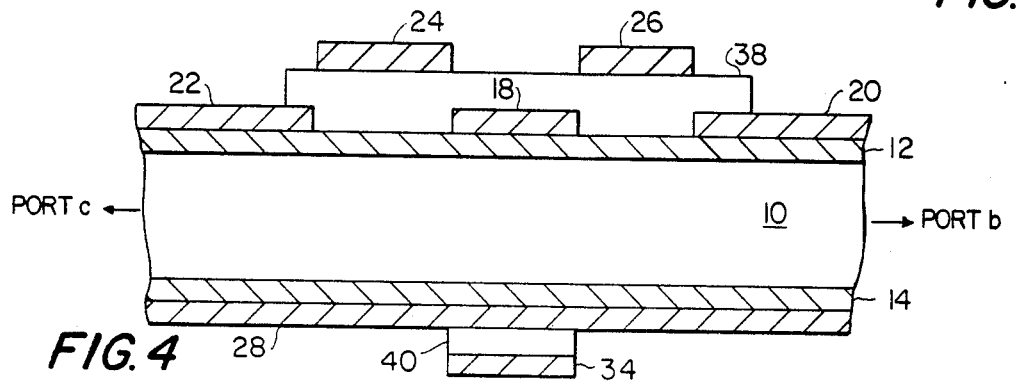
FIG. 4 is a cross-sectional view of the switch of FIG. 1 taken along line 4—4 in FIG. 1.

Considering now the electrodes on the top surface of the switch as shown in FIGS. 1 and 2, primary electrode 18 is formed directly on top of optical isolation layer 12 and extends the entire length of the switch from port a to port d. Primary electrode 20, formed directly on the optical isolation layer 12, and switching electrode 26 form an electrode strip extending from port b to a first edge of primary electrode 18. Switching electrode 24 and primary electrode 22, the latter formed directly on the optical isolation layer 12, form an electrode strip extending from the other edge of primary electrode 18 to port c. As best shown in FIG. 4, which is a cross-sectional view along line 4—4, a high-dielectric-constant layer 38, such as $BaTiO_3$ of 1–10 $\mu m$ in thickness, electrically isolates the switching electrodes 24 and 26 from primary electrodes 18, 20, and 22. Thus two intersecting electrode strips are disposed over the top surface of the switch: one strip comprising electrode 18 and extending from port a to port d; the other strip comprising electrodes 20, 26, part of electrode 18, 24, and 22, and extending from port b to port c. As noted earlier, the intersecting strips preferably are of a width approximately equal to the core diameter of the fibers to which the switch is to be coupled. The requirements for the angle of intersection between the two strips will be discussed hereinafter in connection with the description of the operation of the present invention.

Figure 5:
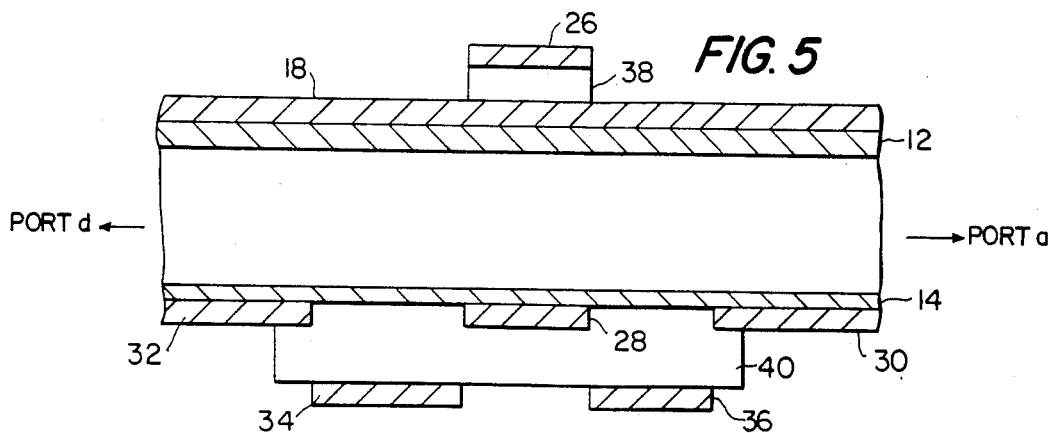
FIG. 5 is a cross-sectional view of the switch of FIG. 1 taken along line 5—5 in FIG. 1.

Considering now the electrodes on the bottom surface of the switch as shown in FIGS. 1, 3, and 5, primary electrode 28 is formed directly on the optical isolation layer 14 and extends from port b to port c directly below the top-surface electrodes 20, 22, 24, 26. Primary electrode 30, formed directly on the optical isolation layer 14, and switching electrode 36 form an electrode strip extending from port a to a first edge of primary electrode 28. Switching electrode 34 and primary electrode 32, the latter formed directly on the optical isolation layer 14, form an electrode strip extending from the other edge of the primary electrode 28 to port d. Electrodes 30, 32, 34 and 36 are vertically disposed directly below the top-surface electrode 18. As shown in FIG. 5 which is a cross-sectional view along line 5—5, a high-dielectric-constant layer 40 (corresponding to layer 38 on the top surface) electrically isolates the switching electrodes 34 and 36 from the primary electrodes 28, 30, 32.

Assuming that the slab 10 of electrooptic crystal is oriented so that an electric field directed from the top surface to the bottom surface causes an increase in the index of refraction of the slab, the operation of the multimode switch will now be described. A constant positive potential is applied to top-surface primary electrodes 18, 20, and 22 relative to the bottom-surface primary electrodes 28, 30, and 32. For example, a voltage of $+V$ may be applied to the top-surface primary electrodes while the bottom-surface primary electrodes are at zero volts. Appropriate switching voltages $V_{24}$, $V_{26}$, $V_{34}$, $V_{36}$ may then be applied to switching electrodes 24, 26, 34 and 36, respectively, to provide a four-port device with inputs a or b and outputs c or d. Defining the switching voltages by $V_{24}=V_{26}=V_T>V$ and $V_{34}=V_{36}=V_B<0$, the switching voltages may be applied to the electrodes to provide four-port operation as follows:

| Optical Path | Electrode 24 | Electrode 26 | Electrode 34 | Electrode 36 |
|---|---|---|---|---|
| a → c | $V_T$ | none | none | $V_B$ |
| a → d | none | none | $V_B$ | $V_B$ |
| b → c | $V_T$ | $V_T$ | none | none |
| b → d | none | $V_T$ | $V_B$ | none |

In this way, an optical waveguide is induced in the electrooptic slab 10 along the desired path by the effect of the electric field between the electrodes on the top surface and the bottom surface of the slab 10. Of course, the device can be operated with optical power traveling in either direction.

Note that switching electrode pairs (24 and 26) and (34 and 36) are disposed on opposite sides of the slab 10. This avoids arcing between adjacent electrodes which would occur if all the switching electrodes were on the same side. Also note that since the top switching electrodes 24 and 26 and the bottom switching electrodes 34 and 36 are raised or lowered vertically above or below the corresponding primary electrodes, inefficient horizontal field gaps are avoided and a more uniform field is applied to the waveguide region when the switching voltage is applied. As previously noted, the high dielectric constant layers 38 and 40 isolate the switching electrodes from the primary electrodes. These layers 38 and 40 develop only a small voltage drop across their thickness when voltages are applied to the switching electrodes. The use of vertically-displaced switching electrodes and high dielectric constant material in the vertical gaps yields the most efficient use of applied voltage. For switching voltages only slightly (less than a factor of two) higher than the primary electrode voltages, the electric field can be made approximately constant in the waveguide gap and the optical path made continuous. Voltages are expected to be typically on the order of a few hundred volts.

As a specific example consider the formation of the optical path between port a and port c. In this case, switching electrode 24 is set to potential $V_T$ and electrode 36 is set to potential $V_B$ while electrodes 26 and 34 are not connected to any potential so that they have no electric field associated with them. The field between electrodes 18 and 30 induces a first section of the path in the slab; the field between electrode 18 and 36 induces a second section; the field between electrodes 18 and 28 induces a third section; the field between electrodes 24 and 28 induce a fourth section; and the field between electrodes 22 and 28 induces the final section. An optical signal entering port a will propagate straight through the first three sections, but upon reaching the end of the third section (the right edge of electrode 28 in FIG. 3), the optical signal sees a barrier (i.e., a low index region) because there is no electric field associated with electrode 34 and thus no waveguide induced between electrodes 34 and 18. It is important to note at this point that the switching electrodes must be sufficiently long so that fringing fields from the primary electrodes do not connect underneath them when there is no potential applied to the switching electrode. In this case referring to FIG. 5, switching electrode 34 must have sufficient length along the line 5—5 so that the fringing fields from electrode 32 to electrode 28 to electrode 18 do not connect to induce an undesired optical path in the slab 10 between them.

The physical mechanism of direction change for the optical path is total internal reflection of the optical signal at the boundary of the high index region. The reflection of the optical signal at the boundary is a function of the angle $\theta$ (the angle between the intersecting waveguide paths) and the size of the index change at the boundary. In practice, the angle $\theta$ and the applied voltages would be designed according to the numerical aperture of the optical fiber to be used with the device. Thus angle $\theta$ and the voltages at the index boundary regions are chosen to provide total internal reflection of the optical signal at the boundary. Typically the angle between the waveguide paths would be about one degree. It is noted that the angle $\theta$ in FIG. 1-3 is shown much larger than it would be in an actual device for reasons of clarity. Thus the length-to-width ratio of the actual device is much greater than depicted in the Figures.

It is appropriate to note at this point some of the advantages of a switch according to the present invention in addition to the advantages generally associated with multimode devices such as low switch-to-fiber coupling loss. The present design allows true four port switching with optical power traveling in either direction. The use of both primary and switching electrodes allows the length of the switching electrodes to be minimized. This should lead to significantly lower device capacitance and substantially lower power requirements than found in devices where all the waveguide forming electrodes are switched. It should be apparent that the non-switched waveguides (i.e., those guides formed by the fields between the primary electrodes without any contribution from switching electrodes) may be replaced by passively fabricated waveguides such as may be formed by metal-ion indiffusion into $LiNbO_3$ or other methods. The switching electrodes and those portions of primary electrodes 18 and 28 which couple with the switching electrodes of course will still be required.

It is further noted that the present design permits the switching of two polarizations simultaneously. This is important because both polarizations are found to propagate simultaneously in optical fibers and polarization-independent operation is necessary to process these real signals. For a specific example, consider a slab 10 of $LiNbO_3$ oriented with the optic (C) axis perpendicular to the slab and propagation in a cubic direction. The TM modes and TE modes would utilize the $r_{33}(=30\times10^6$ m/V) electrooptic coefficient and the $r_{13}(=9\times10^6$ m/V) electrooptic coefficient, respectively. By adjusting the applied voltage for the lower $r_{13}$ coefficient, the TM modes would simply see a stronger waveguide and both modes would be switched, making the switch polarization-independent.

Obviously, many modifications and variations of the present invention are possible in light of the above teachings. It is therefore to be understood that within the scope of the appended claims, the invention may be practiced otherwise than as described.

What is claimed and desired to be secured by Letters Patent of the United States is:

1. An optical waveguide switch comprising:
 a thin elongated slab of electrooptic material;
 a first strip electrode disposed over the top surface of said slab, said first strip electrode extending over the top surface between a first port (a) at a first end of the slab and a second port (d) at the other end of the slab;
 a second strip electrode disposed over the bottom surface of the slab, said second strip electrode extending diagonally over the bottom surface between a third port (b) at said first end of the slab and a fourth port (c) at said other end of the slab, said second strip electrode oriented relative to said first strip electrode so that a plane orthogonal to the surfaces of the slab and longitudinally bisecting said second strip electrode and a plane orthogonal to the surfaces of the slab and longitudinally bisecting said first strip electrode intersect in the slab;
 a third strip electrode disposed over the bottom surface of said slab directly below said first strip electrode, said third strip electrode extending from said first port (a) to a first edge of said second strip electrode and being electrically isolated therefrom, said third strip electrode comprising two sections, the section closest to said second strip electrode being electrically isolated from the other section;
 a fourth strip electrode disposed over the bottom surface of said slab directly below said first strip electrode, said fourth strip electrode extending from said second port (d) to the second edge of said second strip electrode and being electrically isolated therefrom, said fourth strip electrode comprising two sections, the section closest to said second strip electrode being electrically isolated from the other section;
 a fifth strip electrode disposed over the top surface of said slab directly above said second strip electrode, said fifth strip electrode extending from said third port (b) to a first edge of said first strip electrode and being electrically isolated therefrom, said fifth strip electrode comprising two sections, the section closest to said first strip electrode being electrically isolated from the other section;
 a sixth strip electrode disposed over the top surface of said slab directly above said second strip electrode, said sixth strip electrode extending from said fourth port (c) to the second edge of said first strip electrode and being electrically isolated therefrom, said sixth strip electrode comprising two sections, the section closest to said first step electrode being electrically isolated from the other section,
 whereby electric potentials may be selectively applied to said electrodes and to their component sections to selectively induce an optical path between said first and second ports, or between said first and fourth ports, or between said third and fourth ports, or between said third and second ports.

2. The optical switch as recited in claim 1 wherein said third and fourth strip electrodes are vertically displaced from said first strip electrode; and wherein said fifth and sixth strip electrodes are vertically displaced from said second strip electrode.

3. The optical switch as recited in claim 1 wherein said electrooptic material is a ferroelectric material.

4. The optical switch as recited in claim 1 further comprising:
optical isolation layers disposed on the top and bottom surfaces of said slab.

5. The optical switch as recited in claim 4 wherein said third and fourth strip electrodes are vertically displaced from said first strip electrode; and
wherein said fifth and sixth strip electrodes are vertically displaced from said second strip electrode.

6. The optical switch as recited in claim 5 wherein said electrooptic material is a ferroelectric material.

7. An optical waveguide switch comprising:
a thin elongated slab of electrooptic material;
a first strip electrode disposed over the top surface of said slab, said first strip electrode extending over the top surface between a first port (a) at a first end of the slab and a second port (d) at the other end of the slab;
a second strip electrode disposed over the bottom surface of the slab, said second strip electrode extending diagonally over the bottom surface between a third port (b) at said first end of the slab and a fourth port (c) at said other end of the slab, said second strip electrode oriented relative to said first strip electrode so that a plane orthogonal to the surfaces of the slab and longitudinally bisecting said second strip electrode and a plane orthogonal to the surfaces of the slab and longitudinally bisecting said first strip electrode intersect in the slab;
a third strip electrode disposed over the bottom surface of said slab directly below said first strip electrode, said third strip electrode extending from said first port (a) to the first edge of said second strip electrode, said third strip electrode being electrically isolated from said second strip electrode;
a fourth strip electrode disposed over the bottom surface of said slab directly below said first strip electrode, said fourth strip electrode extending from said second port (d) to the second edge of said second strip electrode, said fourth strip electrode being electrically isolated from said second strip electrode;
a fifth strip electrode disposed over the top surface of said slab directly above said second strip electrode, said fifth strip electrode extending from said third port (b) to the first edge of said first strip electrode, said fifth strip electrode being electrically isolated from said first strip electrode; and
a sixth strip electrode disposed over the top surface of said slab directly above said second strip electrode, said sixth strip electrode extending from said fourth port (c) to the second edge of said first strip electrode, said sixth strip electrode being electrically isolated from said first strip electrode,
said third strip electrode comprising a seventh electrode and an eighth electrode, said seventh electrode extending from said first port (a) to the edge of said eighth electrode, said eighth electrode extending from the edge of said seventh electrode to the edge of said second strip electrode, said eighth electrode being vertically displaced from and electrically isolated from said second strip electrode and said seventh electrode.

said fourth strip electrode comprising a ninth electrode and a tenth electrode, said ninth electrode extending from said second port (d) to the edge of said tenth electrode, said tenth electrode extending from the edge of said ninth electrode to the edge of said second strip electrode, said tenth electrode being vertically displaced from and electrically isolated from said second strip electrode and said ninth electrode.

said fifth strip electrode comprising an eleventh electrode and a twelfth electrode, said eleventh electrode extending from said third port (b) to the edge of said twelfth electrode, said twelfth electrode extending from the edge of said eleventh electrode to the edge of said first strip electrode, said twelfth electrode being vertically displaced from and electrically isolated from said first strip electrode and said eleventh electrode, and said sixth strip electrode comprising a thirteenth electrode and a fourteenth electrode, said thirteenth electrode extending from said fourth port (c) to the edge of said fourteenth electrode, said fourteenth electrode extending from the edge of said thirteenth electrode to the edge of said first strip electrode, said fourteenth electrode being vertically displaced from and electrically isolated from said first strip electrode and said thirteenth electrode, whereby non-switched optical channels may be induced in said slab between said first strip electrode and said seventh electrode, between said first strip electrode and said ninth electrode, between said second strip electrode and said eleventh electrode, and between said second strip electrode and said thirteenth electrode by applying a constant electric potential between said first, eleventh, and thirteenth electrodes disposed over the top surface and said second, seventh, and ninth electrodes disposed over the bottom surface, and whereby optical channels may be selectively induced in said slab between said first strip electrode and said eighth electrode, or said first strip electrode and said tenth electrode, or said second strip electrode and said twelfth electrode, or said second strip electrode and said fourteenth electrode by the application of appropriate electric potentials between said electrodes.

8. The optical switch as recited in claim 7 further comprising:
optical isolation layers disposed on the top and bottom surfaces of said slab.

9. The optical switch as recited in claim 8 wherein said electrooptic material is a ferroelectric material.

* * * * *